United States Patent [19]

Thedford et al.

[11] Patent Number: 4,501,112
[45] Date of Patent: Feb. 26, 1985

[54] COTTON HARVESTING MACHINE PNEUMATIC DUCT SYSTEM

[75] Inventors: Guy N. Thedford; Robert M. Fachini, both of Naperville; Dennis K. Sullivan, Elmhurst, all of Ill.

[73] Assignee: International Harvester Co., Chicago, Ill.

[21] Appl. No.: 625,474

[22] Filed: Jun. 27, 1984

[51] Int. Cl.³ .............................. A01D 45/18
[52] U.S. Cl. .............................. 56/13.3; 56/30
[58] Field of Search .............. 56/13.2, 13.3, 16.6, 56/30-32, 28

[56] References Cited

U.S. PATENT DOCUMENTS

| 711,116 | 10/1902 | Mitchell | |
| 1,135,096 | 4/1915 | Beach | |
| 1,850,719 | 3/1932 | Herz | |
| 1,885,437 | 11/1932 | Harazin | |
| 1,887,831 | 11/1932 | Willett et al. | |
| 2,065,721 | 12/1936 | Mutzbauer | 56/27 |
| 2,446,968 | 8/1948 | Toner | 302/36 |
| 2,729,513 | 1/1956 | Swim, Jr. | 302/58 |
| 2,741,888 | 4/1956 | Hamel et al. | 56/30 |
| 2,912,285 | 11/1959 | Hubbard | 302/58 |
| 2,986,861 | 6/1961 | Hubbard | 56/41 |
| 3,031,828 | 5/1962 | Graham | 56/14 |
| 3,088,262 | 5/1963 | Graham | 56/41 |
| 3,114,227 | 12/1963 | Morkoski | 56/12 |
| 3,176,451 | 4/1965 | Hubbard | 56/14 |
| 3,205,016 | 9/1965 | Panning | 302/23 |
| 3,352,092 | 11/1967 | Hubbard | 56/12 |
| 3,373,547 | 3/1968 | Hubbard | 56/44 |
| 3,378,309 | 4/1968 | Copley | 302/17 |
| 3,387,437 | 6/1968 | Owen | 56/12 |
| 3,397,522 | 8/1968 | Sanderson et al. | 56/30 |
| 3,464,191 | 9/1969 | Copley | 56/12 |
| 3,515,437 | 6/1970 | Copley | 302/59 |

OTHER PUBLICATIONS

John Deere Operator's Manual (Two-Row Cotton Picker).
International Harvester Brochure (Models 114A, 120A, 120AL).
International Harvester Operator's Manual (Models 414 and 420).
Fan Engineering, Published by the Buffalo Forge Company.

Primary Examiner—Jay N. Eskovitz
Attorney, Agent, or Firm—Ernest E. Helms; F. David AuBuchon

[57] ABSTRACT

The present invention provides an improved cotton duct structure for a cotton harvester. The air supply line has a nozzle which releases air on the cotton ducts ascending front wall, thereby projecting harvested cotton in a direction towards the receptacle on the cotton harvesting machine.

10 Claims, 4 Drawing Figures

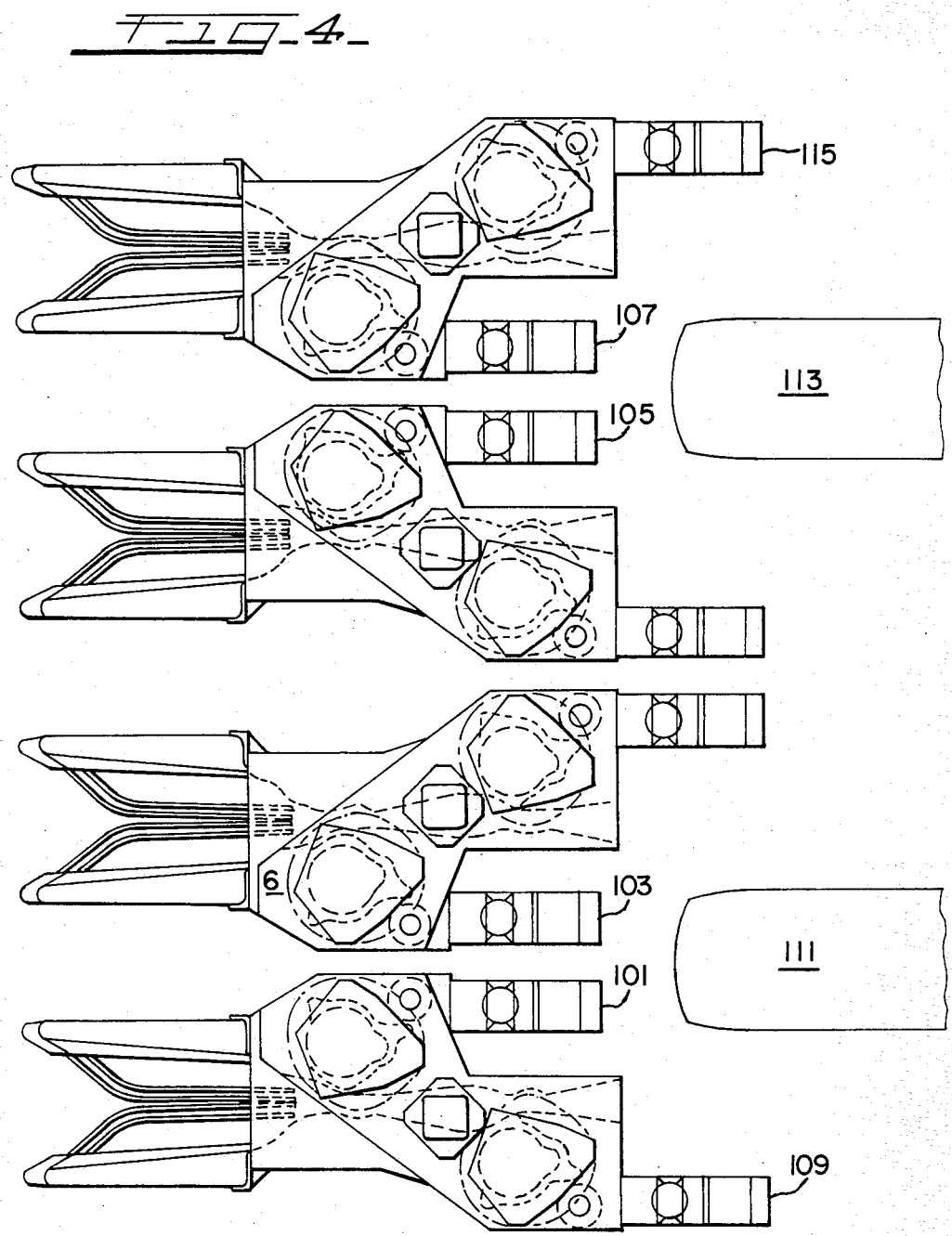

COTTON HARVESTING MACHINE PNEUMATIC DUCT SYSTEM

BACKGROUND OF THE INVENTION

The present invention relates generally to cotton harvesting machines. More particularly this invention relates to the air system for conveying the harvested cotton from the harvesting means to the point of entry of the conveyor tubes, which connects the harvesting means with the receptacle carried by the cotton harvesting machine.

Cotton harvesting machines typically comprise a wheeled vehicle with harvesting means mounted in front adjacent to the ground, and a receptacle commonly referred to as a basket mounted on top towards the vehicle midpoint and rear. The harvesting means is often a picker spindle and doffer type which harvests the lint cotton from the plant itself without picking off the total boll. The cotton lint is pneumatically induced from the doffers into an adjacent duct. An inclined pneumatic conveyor tube connects the duct with inlets in the cotton basket for transporting the cotton lint from the duct to the cotton basket. The present invention provides an improved apparatus for transporting the cotton from the point of receipt of harvested cotton off of the harvesting means doffers to the point wherein the cotton first enters the conveyor tubes which connect the duct with the basket inlets.

DISCLOSURE STATEMENT

Presently, some cotton harvesting machines utilize a pneumatic conveyor system which works upon the principles described in Beach U.S. Pat. No. 1,135,096, Harazin U.S. Pat. No. 1,885,437, and Copley et al. U.S. Pat. No. 3,378,309. The above U.S. patents disclose pneumatic cotton conveyors wherein the harvested cotton does not pass through the blower. In Copley et al. U.S. Pat. No. 3,378,309 the cotton is removed from the harvesting compartment by suction caused by a vacuum created by a source of pressurized air being ejected into a tubular passage.

Copley et al. U.S. Pat. No. 3,464,191 discloses a modification of a duct system of Copley et al. U.S. Pat. No. 3,378,309. Copley et al. U.S. Pat. No. 3,464,191 teaches that the entrance of air into the rear portion of the compartment or duct is in the rear wall thereof above the lower transverse edge of the transverse panel. The teachings of Copley et al. U.S. Pat. No. 3,464,191 are also demonstrated in Copley et al. U.S. Pat. No. 3,515,437.

A major problem associated with the duct designs illustrated in Copley et al. U.S. Pat. Nos. 3,464,191 and 3,515,437 is that the air flow must change directions. When bringing in air from the rear of the ascending leg of the duct, the forced air flow is first pointed in a direction towards the front of the harvesting machine. The forced air is then redirected back by the duct towards the receptacle of a harvesting machine. The redirection of the forced air flow decreases the efficiency of operation. Another major problem associated with preexisting designs which have the air nozzle inserted in the rear wall of the ascending leg of the air duct, is that the air connection hose is suspended outside of the cotton duct. Providing the air connection hose outside of the duct presents clearance problems with the front wheels when upgrading the cotton harvesting machine from a two row to a four row machine. The dangling of the air connection hose outside of the cotton duct also presents problems of entanglement with trash and other objects which have a tendency to damage the hose.

SUMMARY OF THE INVENTION

To overcome the above-noted and other problems the present invention is brought forth. The air nozzle outlet of the air supply line of the present invention is pointed in such a direction that the air is constrained from traveling in a direction away from the receptacle. With the present invention the transport of cotton is more efficient since the air is supplied upwards in a direction towards the cotton basket, eliminating air turbulence of prior designs. The present invention is also advantageous in that it simplifies construction of the air nozzle and is cheaper to manufacture requiring less labor and less intricate design. An embodiment of the air supply line of the present invention forms a part of the cotton duct. The air supply line of the present invention also has a very desirable feature of eliminating air supply duct work outside of the rear compartment, thereby preventing air supply hoses from being entrapped or interfering with other portions of the harvesting machine.

It is the object of the present invention to provide a cotton duct which is more efficient in the delivery of cotton from the harvesting means to the cotton receptacle. It is a desire of the present invention to reduce the volumetric requirements of the air supply line for a pneumatic conveyor system on a cotton harvesting machine. It is a desire of the present invention to provide a cotton duct on a harvesting machine which eliminates the necessity of placing a nozzle in the exterior of the rear wall of the ascending leg of the cotton duct. It is an object of the present invention to provide a cotton harvester with a cotton duct design which allows more clearance for tires while keeping the center of gravity of the relatively heavy harvesting units as close as possible to the axle. It is an object of the present invention to provide a cotton harvester with a cotton duct design which allows the use of larger tires on the cotton harvesting machine. It is still another object to provide a cotton harvester with a less complex cotton duct which is easier to manufacture. It is still yet another desire of the present invention to provide a cotton duct wherein the cotton duct wall provides part of the lining for the air supply system line. It is an object of an embodiment of the present invention to provide a cotton air duct system wherein the cotton leaves the doffers and directly enters the duct, without being redirected by panel members.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 4 is a partial top elevational schematic of a four-row harvesting machine, illustrating the row units with the connected cotton ducts, and the location of the front wheels.

DETAIL DESCRIPTION OF THE DRAWINGS

Figure 1:
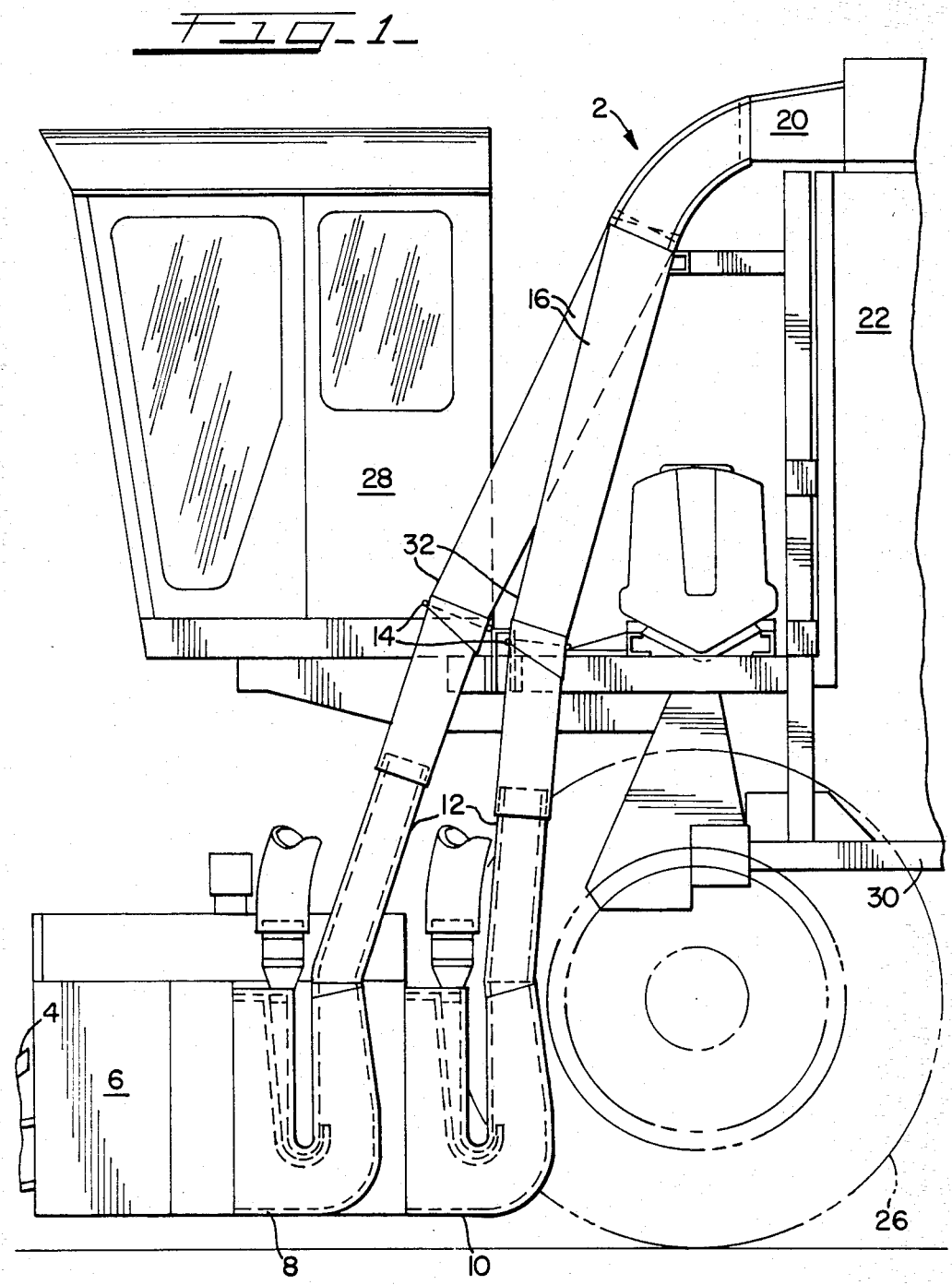
FIG. 1 is a side elevational view of portions of the cotton harvester of the present invention.

Referring to FIG. 1, the relevant front portion of a cotton harvester is illustrated. The harvester is controlled by an operator (not shown) located in cab 28. Cotton basket 22 is mounted adjacent the frame 30 midpoint and rear. Wheel 26 is provided for support and locomotion. Mounted adjacent the front of the harvester, is the harvesting or row unit 6 of the picker type (also referred to as picker unit or drum). Plant lifter 4 guides the cotton plants into row unit 6 which extracts the lint cotton from the plant. The harvested cotton lint is then transported through cotton ducts 8 and 10 to lower extensions 12 of the conveyor tubes 32.

Lower extensions 12 are pivotally connected to upper extensions 16 at hinge point 14. From the conveyor tubes 32 the cotton is delivered to the basket 22 through basket inlet 20.

Figure 2:
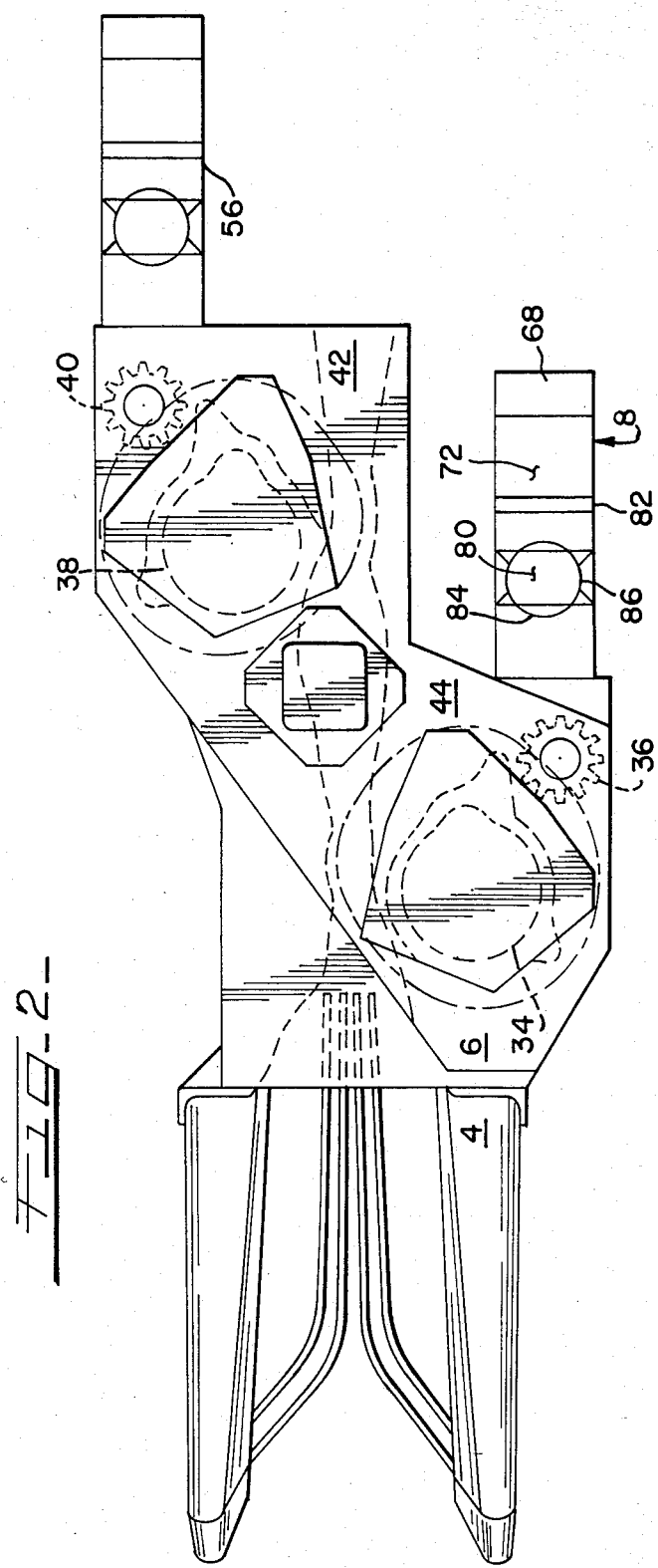
FIG. 2 is a top elevational view of the row unit with connected cotton duct.

The row unit as illustrated in FIG. 2 has a front spindle rotor 34 with corresponding doffer 36. On the opposite side of the cotton passage 42 is the rear picker spindle rotor 38 and corresponding doffer 40. Duct 8 serves front doffer 36, and duct 56 serves rear doffer 40.

Figure 3:
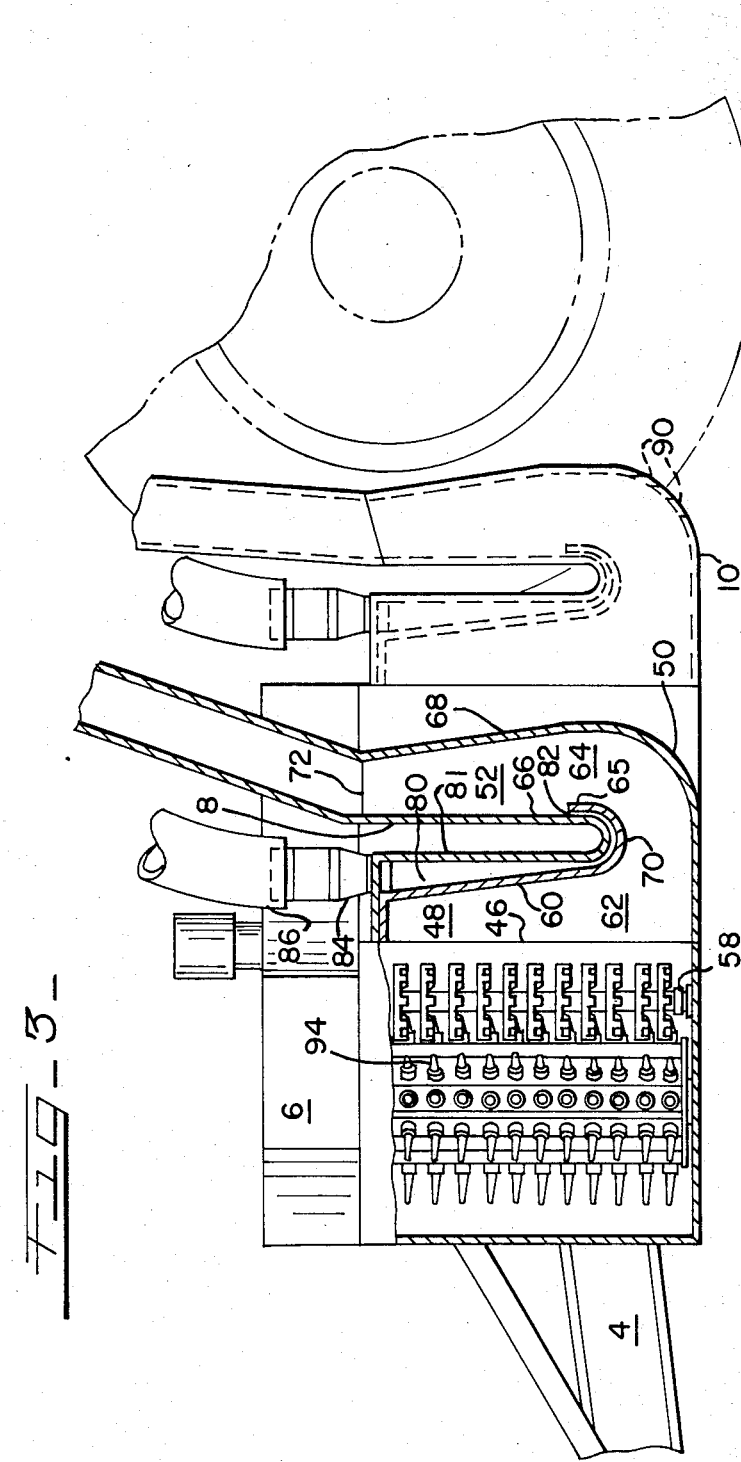
FIG. 3 is a partial enlarged view of the cotton harvester of FIG. 1 illustrating portions of the row unit in section and portions of the wheel removed for clarity of illustration.

Referring to left-hand (or number 2 drum of a four row machine as determined by operator's view from left to right) row unit 6 of FIG. 3, the duct system of the present invention has six major elements. The first element is the inlet port 46 which is adjacent the exit passage from the doffer 58. The next three major elements are a descending leg 48 and an ascending leg 52 which are joined by an elbow section 50 thereby giving the duct 8 a generally U-shape. The descending leg 48 has a rear wall 60 which is generally opposite the duct inlet 46. The descending leg 48 also has an outlet 62 generally located at its lower end. The elbow 50 receives cotton from the descending leg outlet 62 and redirects the cotton to the ascending leg 52 at the elbow outlet 64. The ascending leg 52 which is rearward of the descending leg 48, has front walls 65 and 66, and a rear wall 68. Ascending leg 52 also has an outlet 72 in an upward direction generally aligned with the conveyor tube lower extension 12.

Located generally adjacent the descending leg rear wall 60, the elbow upper wall 70 and the ascending leg front wall 65 is the air supply line 80. Air supply line 80 is also defined by exterior wall 81 which connects with wall 66 at a nozzle outlet located at 82. The air supply line 80 nozzle outlet 82 is along the ascending leg front wall. The location of the nozzle outlet 82 on the forward side of the ascending leg 52 causes the induced air flow to be in an upward direction expanding outwardly towards the ascending leg rear wall 68.

Referring to the identical duct structure 8 of FIGS. 3 and 2, the cotton duct has a generally rectangular cross sectional area. The rectangular cross sectional area facilitates a design which is generally easy to fabricate. The air supply line 80 has an inlet 84 on its top with a funnel adapter. The funnel adapter 84 provides for a connection between the cotton duct and the circular section air hose 86, which runs to the blower of the cotton harvesting machine. The design of the air supply line 80 provides ease of fabrication in that it utilizes the descending leg rear wall 60, the concave surface 70 of the elbow and the ascending leg front wall 65 as well as exterior wall 81 to generate a supply line with converging inner and outer concave surfaces.

Optional to the present invention and illustrated on cotton duct 10 of FIG. 3 are vents 90, which are utilized to bleed in ambient air into the cotton duct to prevent excess suction within the duct. The vents 90 may be a set of louvers as shown in FIG. 3 or a variable area type vent.

In operation the doffer 58 with a wiping action dislodges the cotton from the picker spindles 94. The cotton lint passes through port 46, and is acted upon by gravity within decending leg 48. The cotton lint leaving the descending leg outlet 62 is acted upon the induced air flow caused by air supply nozzle 82. The lint cotton is induced through elbow 50, out elbow outlet 64 and into ascending leg 52. After passing air supply nozzle 82, the lint is transported by the forced draft emulating from the supply nozzle. The lint then exits the ascending leg 52 and is routed through conveyor tubes 32 to the cotton basket inlet 20.

On the cotton harvester of FIG. 4, each row unit has two separate cotton ducts. By providing the cotton duct with the air supply nozzle of the present invention, air supply hoses to the rear of cotton ducts 101 and 103 are eliminated. Eliminating the rear air supply hose increases clearance from tire 111. In like manner tire clearance is increased for ducts 107 and 105 from tire 113. The greater clearance allows larger tires and also aids in preventing the entrapment of field trash and prevents wear to the air supply hose connecting the cotton duct with the air blower. Also, access to the cotton ducts is easier due to the lack of blower hoses in the rear.

While a few of the embodiments of the present invention have been explained it will be readily apparent to those skilled in the art of the various modifications which can be made to the present invention without departing from the spirit and scope of the this application as it is encompassed by the following claims.

What is claimed is:

1. A cotton harvesting machine with a duct system for pneumatically transporting cotton from a harvesting means to a conveyor tube comprising:
   a duct having an inlet port generally exposed to the harvesting means for receiving cotton from said harvesting means, said duct being U-shaped, and said duct including:
   a descending leg, said descending leg having a wall generally opposite said duct inlet port and said descending leg having an outlet generally located at its lower end;
   an elbow for receiving cotton from said descending leg outlet and said elbow having an upper and lower wall and said elbow redirecting the cotton to an outlet in a generally upward direction;
   an ascending leg receiving cotton from said elbow outlet, said ascending leg having front and rear walls and said ascending leg having an outlet generally in the upward direction aligned with the conveyor tube; and
   a U-shaped air supply line, said air supply line being adjacent said descending leg rear wall and said elbow upper wall, said air supply line having a nozzle outlet adjacent the forward side of said ascending leg, said nozzle outlet directing an air flow in a generally upward direction.

2. An apparatus as recited in claim 1 wherein said air supply line has an inner concave and an outer concave surface and said air supply line outer concave surface is partially formed by said descending leg rear wall and said elbow upper wall.

3. An apparatus as recited in claim 2, wherein said duct has a rectangular cross sectional area.

4. An apparatus as recited in claim 2, wherein the outer concave surface of said air supply line converges towards inner concave surface of said air supply line as said air supply line extends along said descending leg towards said elbow forming an air supply line with a variable cross sectional area.

5. An apparatus as recited in claim 4, wherein said air supply line has an inlet on top of said descending leg and said inlet is attached to a connector funnel adapted for connection to an air hose opposite said air supply line inlet.

6. An apparatus as recited in claim 1, wherein said elbow has an air vent on its lower wall to bleed in ambient air into said duct.

7. An apparatus as recited in claim 6 wherein said air vent is a variable area air vent.

8. An apparatus as recited in claim 1, wherein said ascending leg rear wall has an air vent on its lower wall to bleed in ambient air into said duct.

9. An apparatus as recited in claim 8 wherein said air vent is a variable area air vent.

10. A picker cotton harvesting machine with a duct system for pneumatically transporting cotton from the doffer to the basket conveyor tube comprising:

a duct having a rectangular cross sectional area being generally U-shaped having in inlet port exposed to the doffer for receiving cotton from the doffer and said duct including;

a descending leg having a rear wall opposite the inlet port and having a outlet located at its lower end;

an elbow for receiving cotton from the descending leg outlet and having an upper and lower wall and said elbow redirecting the cotton to an outlet in an upward direction and said elbow having an air vent along its lower wall;

an ascending leg for receiving cotton from the elbow outlet, said ascending leg having front and rear walls and said ascending leg having an outlet in the upward direction aligned with the conveyor tube; and a U-shaped air supply line being adjacent said descending leg rear wall, and said elbow upper wall, and said air supply line having a cross sectional area which converges towards a nozzle outlet along the forward side of said ascending leg, said nozzle outlet directing an air flow in an upward direction, and said air supply line having a connector for adaption to an air hose.

* * * * *